United States Patent [19]

Formanek et al.

[11] Patent Number: 4,647,478

[45] Date of Patent: Mar. 3, 1987

[54] METHOD FOR THE ORIENTATION OF A LIQUID CRYSTALLINE SUBSTANCE RELATIVE TO A SUBSTRATE

[75] Inventors: Helmut Formanek, Garching; Reinhard Weyl, Assling, both of Fed. Rep. of Germany

[73] Assignee: Siemens Aktiengesellschaft, Berlin and Munich, Fed. Rep. of Germany

[21] Appl. No.: 688,361

[22] Filed: Jan. 2, 1985

[30] Foreign Application Priority Data

Mar. 23, 1984 [DE] Fed. Rep. of Germany ....... 3410789

[51] Int. Cl.⁴ ..................... B05D 5/06; C09K 19/56; C09K 19/36; C09K 19/00
[52] U.S. Cl. .................................. 427/164; 427/168; 427/169; 427/165; 252/299.1; 252/299.4; 252/299.7; 428/1
[58] Field of Search ............. 252/299.4, 299.5, 299.01, 252/299.7; 350/350 R, 340, 341; 428/1; 427/164, 165, 168, 169

[56] References Cited

U.S. PATENT DOCUMENTS

| 328,008 | 4/1973 | Allan et al. ......................... 350/340 |
| 3,619,254 | 11/1971 | Davis ............................... 252/299.7 |
| 3,687,863 | 8/1972 | Wacher ............................... 252/299 |
| 3,698,449 | 10/1972 | Sorkin et al. ..................... 252/299.01 |
| 3,803,050 | 4/1974 | Haas et al. ........................ 252/299.4 |
| 3,910,682 | 10/1975 | Arai et al. ........................ 252/299.4 |
| 3,920,574 | 11/1975 | Brown et al. ..................... 350/350 R |
| 3,975,288 | 8/1976 | Davis ............................... 252/299.7 |
| 3,981,816 | 9/1976 | Moriyama et al. ............... 252/299.4 |
| 4,316,041 | 2/1982 | Totten et al. ..................... 252/299.7 |
| 4,353,943 | 10/1982 | Crossland et al. ..................... 428/1 |

FOREIGN PATENT DOCUMENTS

| 54-49155 | 4/1979 | Japan ................................ 252/299.4 |
| 57-141478 | 1/1982 | Japan ................................ 252/299.7 |
| 8301989 | 6/1983 | PCT Int'l Appl. ....................... 92/8 |

OTHER PUBLICATIONS

Shibaev, Adv. LC Res. & Appl., 1980, 869–897.
Freizdon et al, Adv. LC Res. & Appl., 1980, 899–914.
Goodby et al, MCLC, 86, 303–309.
Indian, J. Pure & Applied Physics, vol. 19, 1981, 769–773.

Primary Examiner—Teddy S. Gron
Assistant Examiner—Jack Thomas
Attorney, Agent, or Firm—Hill, Van Santen, Steadman & Simpson

[57] ABSTRACT

A method for the orientation of a liquid crystalline substance with respect to a substrate to which the substance is to be applied, the method comprising treating the surface of the substrate prior to application of the substance with a solution of at least one steroid, or at least one porphyrin dyestuff or both.

9 Claims, 6 Drawing Figures

METHOD FOR THE ORIENTATION OF A LIQUID CRYSTALLINE SUBSTANCE RELATIVE TO A SUBSTRATE

BACKGROUND OF THE INVENTION

1. Field of the Invention

The present invention is in the field of orienting a liquid crystalline substance relative to a substrate to produce a high contrast between various phases of the liquid crystalline substance. The method involves pretreating the surface of the substrate with an aqueous or organic solvent solution of a steroid and/or a porphyrin dyestuff.

2. Description of the Prior Art

The properties of liquid crystalline substances are utilized for displays and for thermography on the basis of their characteristic of providing an optically identifiable texture transformation.

Thermography, i.e., the measurement of temperature distributions on surfaces, is gaining increasing significance for the development and quality analysis of integrated circuits and other current-carrying electrical components. The presently most sensitive method for identification of "hot spots" which are locally limited, thermally active regions, is temperature measurement with liquid crystal layers in a polarization microscope. Liquid crystal layers are applied to the surface to be investigated. A study of the birefringence of the liquid crystal in the polarized light serves to determine the structures of the liquid crystal. Temperature differences within the surface to be investigated can be determined by structural modifications of the liquid crystal layer on the surface being investigated. Electrical properties within this surface can then be inferred in turn from the temperature differences within the surface to be investigated.

When a liquid crystal layer has been applied to the surface of an integrated circuit, the voltage at that location on the surface which is impinged by a laser beam can be inferred from the intensity of the reflection of the laser beam by means of the liquid crystal layer/surface.

The principle of a "hot spot" detector has been disclosed in PCT patent application No. WO 83/01989. This PCT application is based upon U.S. Ser. No. 326,224, U.S. Pat. No. 4,466,746, filed Dec. 1, 1981 in the names of Hancock et al. This publication refers to an ebulliometric hot spot detector wherein a semiconductor device is placed in a suitable liquid and the liquid pressure is decreased until boiling from sites on the device is observed. The liquid pressure is then increased until boiling ceases while the boiling sites on the device are observed. Small bubbles observed just before cessation of boiling pinpoint the hot spot locations. The pressure at which boiling ceases in a given liquid determines the hot spot temperature.

A uniform orientation of the molecules of liquid crystalline substances across larger surface areas is necessary for the exploitation of properties of such liquid crystalline substances. This orientation can be achieved by means of suitable methods for treating the surfaces that come into contact with the liquid crystalline substances.

Up to the present, surfaces that come in contact with the liquid crystalline substances have been treated by means of rubbing, chemical etching, coating with synthetic resins, organosilanes or amphipatic substances such as lecithin. For example, U.S. Pat. No. 3,728,008 discloses the chemisorption of a silane derivative on those surfaces of a liquid crystal display means that come in contact with the liquid crystalline substance. The chemisorbed silane derivative is intended to effect a clear display and to improve the contrast of the display.

SUMMARY OF THE INVENTION

The present invention provides a method of the type mentioned which is easy to use, which has a long-lasting and reliable effect, which is particularly cheap to carry out, which enables a high degree of orientation of the liquid crystalline molecules, and thus provides a clear display which produces a particularly sharp contrast between various phases of the liquid crystalline substance. This objective is achieved by precoating the substrate to which the liquid crystalline substance is applied by means of one or more steroids, one or more porphyrin dyestuffs, or both, in water or an organic solvent.

It has been found that a parallel orientation of the longitudinal axes of the molecules, particularly the molecules of nematic liquid crystalline substances with respect to the substrate can be achieved in accordance with the invention in a particularly effective way through the pretreatment of the substrate with solutions of steroids and/or porphyrin dyestuffs in water and/or organic solvents. Concentration of the treating solution is in the range from about 0.005% to 0.05%.

BRIEF DESCRIPTION OF THE DRAWING

The invention will be explained in greater detail with reference to the drawing in which.

DESCRIPTION OF THE PREFERRED EMBODIMENTS

Figure 1:
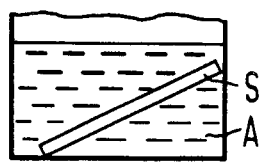
FIGS. 1 through 4 illustrate methods which can be used according to the present invention for treating a substrate for receiving a liquid crystalline substance.

Several inventive methods for the treatment of the surface of a substrate S for receiving a liquid crystalline substance C are illustrated in FIGS. 1 through 4. In FIG. 1 there is illustrated a glass plate S which is immersed into a 0.01 % solution A of a steroid or a porphyrin dyestuff or a combination of at least one steroid and at least one porphyrin dyestuff in water and/or in an organic solvent. The concentration of the solution need not be very precise with respect to the present invention. The method can be employed with a concentration of solution A as low as 0.005% or up to 0.05%.

Figure 2:
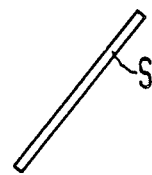

As illustrated in FIG. 2, the substrate S may be tilted toward the vertical so that the majority of the solvent or at least the excess flows off from the surface of the substrate S. The rest of the solution A dries on the surface of the substrate S. A surface treated in such a fashion does not differ optically from an untreated surface of the substrate S of the same type. This provides a particular advantage over the prior art because the optical properties of the liquid crystal display means or of a thermography subject are not influenced in an undesired fashion by an adhesion promoter such as, for example, a synthetic resin, an organosilane, or lecithin.

Consequently, the method of the invention has a reliable and long-lasting effect in comparison to a surface treatment by means of rubbing which, although it likewise does not alter the optical properties of the substrate S, has an effect which tends to disappear after a short time.

In the case of thermographic investigation of electronic components, a coating on the surface of an electronic component with a synthetic resin or other such materials would complicate the investigation of properties of the electronic component because the communication of information about the properties of the substrate S would be greatly attenuated by such a layer such as a synthetic resin. In addition, the method of the invention provides a clear and high contrast operation of a liquid crystal display in the transmission mode which would likewise be greatly inhibited by coating the substrate S with a synthetic resin or the like.

Finally, when a substrate S is coated with a synthetic resin or the like, there must be as uniform a coating as possible of these additional coating substances, and this is accomplished only at great expense. Since the majority of the solvent in the method of the present invention can flow off from the substrate S by itself and the residue of the solution A naturally dries on the surface of the substrate S having the required uniformity, the method of the present invention is considerably cheaper to carry out than the method of the prior art and would have a similar long-lasting effect.

Figure 3:
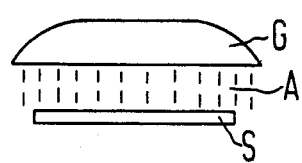

FIG. 3 illustrates a horizontally disposed glass plate having an area, for example, of 2.5×7.6 cm² used as the substrate S. The substrate is moistened with about 0.1ml of the aforementioned solution A from a spray device G. The majority of the solvent again flows off by means of subsequent tilting, particularly by means of subsequently placing the substrate S into a vertical attitude. The remainder of the solution A again dries on the surface of the substrate S.

Figure 4:

FIG. 4 shows another method according to the present invention. The surface of the substrate S is moistened with a suitable quantity of the solution A which is contained in an absorbent carrier P which has been moistened with the solution A. The carrier moistened with the solution is then pressed against the surface of the substrate S. The carrier P can be a material such as a fine-pored sponge, a porous rubber, or a synthetic plastic or the like.

When about 0.1 ml of a solution of N-(p-methoxy benzylidene)-p-n-butyl-aniline, a nematic liquid crystalline substance in hexane as a solvent (usually known under the abbreviation MBBA), has been applied to a glass plate as described in connection with FIG. 3, being uniformly applied to the horizontally disposed glass plate and dried thereon, then the following phenomena can be observed dependent on the surface treatment of the glass plate. When the surface of the glass plate is untreated, the liquid crystalline substance contracts into individual drops after the evaporation of the solvent (hexane) of the liquid crystal. When, however, the surface of the glass plate has been treated with a method of the invention, a uniform liquid crystalline layer remains on the subject carrier after the evaporation of the hexane solvent of the liquid crystalline material MBBA. In the polarization microscope, the ordered regions of the liquid crystalline layer appear luminously bright at angular positions of 45° between the crossed polarizers.

The surface treatment of the present invention of a glass plate was also treated with the following solutions to achieve the improvements of the present invention:
0.01% solution of desoxycholic acid in absolute ethanol,
0.01% solution of the sodium salt of desoxycholic acid in water,
0.01% solution of saponin in water,
0.01% solution of taurocholic acid in water,
0.01% solution of hematin chloride in 0.01 N NaOH,
0.01% solution of alcian blue in absolute ethanol,
0.01% solution of alcian blue in water.

Figure 5:
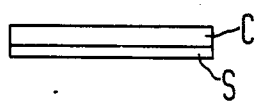
FIG. 5 illustrates rather schematically a liquid crystal display means produced by the present invention.

FIG. 5 schematically illustrates a substrate S whose surface has been treated by the method of the invention and on which a uniform liquid crystal layer C remains. The arrangement shown in FIG. 5 is particularly suited for use in a liquid crystal display means.

Figure 6:
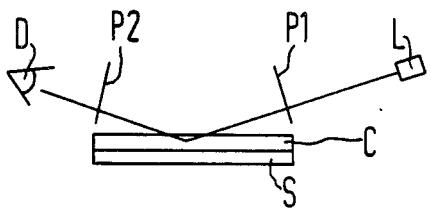
FIG. 6 illustrates the result of the method of the invention in the implementation of thermography measurements.

FIG. 6 illustrates a substrate S which has been likewise treated with the method of the present invention. A uniform liquid crystalline layer C remains on the substrate S which, for example, can be a non-passivated or a passivated surface of an integrated electronic module. The temperature of the liquid crystalline layer C is set such that it is about ½ K below that temperature at which the liquid crystalline substance C is transformed into its amorphous, non-crystalline state. By using a light source L, the location to be investigated on the surface of the substrate S is irradiated with light through a first polarizer P1. This light is reflected at the system composed of the liquid crystal layer C on the surface of the substrate S. The reflected light proceeds through a second polarizer P2 to a detector D which may be a human eye. The polarizers P1,P2 are disposed in crossed relation. For example, when MBBA is employed and the two crossed polarizers P1,P2 are disposed at angular positions of 45° relative to one another, then a crystalline region of the liquid crystal C appears bright at the detector D. When a region of the liquid crystal C has been transformed into the amorphous state due to a rise in temperature, then the polarized light is scattered in this amorphous region and the otherwise clear liquid crystal C appears dark in the reflection at the detector D.

In a thermography method according to FIG. 6, the topical resolution amounts to a few microns and the thermal resolution amounts to a few tenths K. These resolutions correspond to a documentation limit for the heating capacity of a "hot spot" of about 1 mW.

Individual classes of chemical compounds which cause a parallel orientation of the longitudinal axes of the molecules of liquid crystalline substances with respect to their substrate are described below:

The steroids include bile acids which are known as digestion-promoting constituents of gall. They are surface-active and therefore have an emulsifying effect on fats. The most important bile acids are the derivatives of cholic acid and of desoxycholic acid. With fats and other lipids desoxycholic acid forms the water-soluble chlathrate compounds the so called acids wherein, for example, each molecule of palmitic acid or stearic acid is surrounded by eight molecules of desoxycholic acid.

The saponins are glycosidic vegetable steroids which form frothy aqueous solutions and therefore have been used as cleaning agents. The cardiac-active digitalis glucosides and toad's venoms are also typical saponins.

Porphyrins are usually defined as any of a group of metal-free pyrrole derivatives, formed in protoplasm by the decomposition of hemoglobin and chlorophyll. The prophyrins and phthalocyanines are chemical compounds consisting of a ring system with continuously conjugated double bonds. As mesomeric systems, they are planarly constructed and contain a metal atom bonded in their center. Porphyrine rings exist in the hematin chloride of the red hemoglobin and in the chlorophyll of green leaves. Alcian blue is a water-soluble derivative of the dyestuff copper phthalocyanine that is nearly insoluble in all inorganic and organic solvents.

The present invention is not only applicable to nematic liquid crystalline substances but to any liquid crystal that can be oriented.

It should be evident that various modifications can be made to the described embodiments without departing from the scope of the present invention.

We claim as our invention:

1. A method for the uniform orientation of the molecules of a liquid crystalline substance with respect to a substrate to which said substance is to be applied which comprises treating the surface of said substrate prior to application of said substance with a solution of at least one steroid, or at least one porphyrin dyestuff or both, and thereafter applying the liquid crystalline substance to the thus treated surface.

2. A method according to claim 1 wherein said solution is an aqueous solution.

3. A method according to claim 1 wherein said solution is a solution in an organic solvent.

4. A method according to claim 1 wherein said solution has a concentration of from 0.005 to 0.05%.

5. A method according to claim 4 wherein said solution has a concentration of about 0.01%.

6. A method according to claim 1 which includes the steps of moistening said substrate with said solution, and then tilting said substrate to permit the excess solution to run off.

7. A method according to claim 1 wherein said solution is sprayed on said substrate.

8. A method according to claim 1 wherein said substrate is immersed into said solution.

9. A method according to claim 1 wherein said solution is contained on an absorbent carrier, and said carrier is pressed against said substrate.

* * * * *